(12) United States Patent
Gariglio

(10) Patent No.: US 6,604,984 B2
(45) Date of Patent: Aug. 12, 2003

(54) GRINDING MACHINE FOR MACHINING SHEETS OF GLASS

(75) Inventor: Davide Gariglio, Piossasco (IT)

(73) Assignee: Forvet S.r.l., Bruino (IT)

( * ) Notice: Subject to any disclaimer, the term of this patent is extended or adjusted under 35 U.S.C. 154(b) by 0 days.

(21) Appl. No.: 09/894,410

(22) Filed: Jun. 28, 2001

(65) Prior Publication Data

US 2002/0061712 A1 May 23, 2002

(30) Foreign Application Priority Data

Jun. 30, 2000 (IT) .................................... TO2000A0663

(51) Int. Cl.[7] .................................................. B24B 7/00
(52) U.S. Cl. ................................ 451/5; 451/41; 451/44
(58) Field of Search ............................... 451/5, 242, 41, 451/246, 450, 43, 44, 178, 182, 257, 444, 449, 456

(56) References Cited

U.S. PATENT DOCUMENTS

| | | | | |
|---|---|---|---|---|
| 4,228,617 A | * | 10/1980 | Bando | 51/3 |
| 4,375,738 A | * | 3/1983 | Bando | 51/3 |
| 4,406,091 A | * | 9/1983 | Eckardt et al. | 51/101 R |
| 4,685,180 A | * | 8/1987 | Kitaya et al. | 29/33 C |
| 5,094,282 A | | 3/1992 | Suzuki et al. | 144/356 |
| 5,146,715 A | * | 9/1992 | Bando | 51/165.77 |
| 5,409,416 A | * | 4/1995 | Eichhorn et al. | 451/41 |
| 6,171,178 B1 | * | 1/2001 | Park | 451/44 |
| 6,196,902 B1 | * | 3/2001 | Gazca-Ortiz et al. | 451/242 |

FOREIGN PATENT DOCUMENTS

| | | |
|---|---|---|
| EP | 0507033 A1 | 7/1992 |
| JP | 08197402 | 8/1996 |

* cited by examiner

Primary Examiner—Lee D. Wilson
(74) Attorney, Agent, or Firm—David A. Farah; Sheldon & Mak PC

(57) ABSTRACT

Grinding machine for machining sheets of glass; in the machine, a sheet which has one of its own perimeter edges which is at least partially to be ground, is advanced on a horizontal plane, through a single work station, where the sheet itself is disposed in an unambiguous reference position on the plane, relative to a support structure, it is held in the reference position itself by a plurality of suckers, and is ground by motorized grinding heads; the machine is provided with actuators for vertically displacing the suckers and, therefore, the sheet of glass between a lowered rest position and a raised position in which the sheet is ground.

18 Claims, 2 Drawing Sheets

GRINDING MACHINE FOR MACHINING SHEETS OF GLASS

CROSS-REFERENCE TO RELATED APPLICATION

Figure 1:
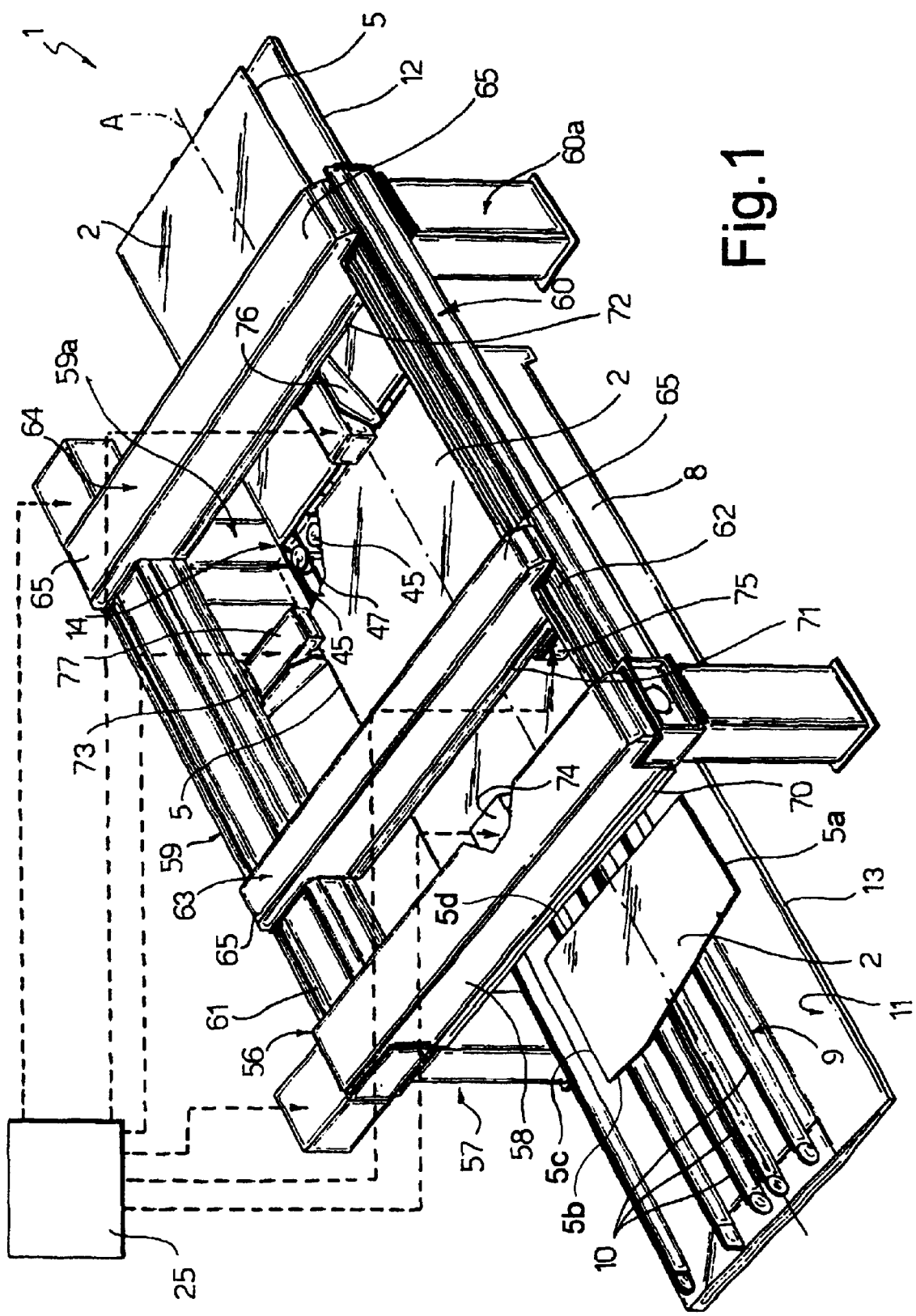

This application claims priority from Italian Patent Application TO2000A 000663 titled "Metodo e Macchina di Molatura per la Lavorazione di Lastre di Vetro," filed Jun. 30, 2000; the contents of which is incorporated by reference herein in its entirety.

BACKGROUND

As is known, after the operations of etching and shearing have been carried out, semi-finished sheets of glass are obtained, the perimeter edges of which are in many cases ground in a grinding system, until the required final geometry is obtained.

In general, in the grinding systems used, the sheets are conveyed along a horizontal path of advance in the shape of an "L", comprising a first and a second section which are at right-angles to one another, on each of which a work station is provided. Each sheet to be processed is advanced through the first work station, it is ground along two sides of the edge, which are disposed on opposite sides of the path of advance, it is moved away from the first station, and is translated towards the second work station, where the sheet is finally ground along the two sides of the edge which are transverse relative to the edges already ground.

The finished products obtained by means of the known grinding systems of the above-described type have the disadvantage that they do not have an invariable quality index relative to one another.

This is owing to the fact that, in order to grind the sides of the edge which are transverse relative to one another, it is necessary to carry out operations of squaring of the sheets at each of the two work stations, and to displace the sheets between the work stations themselves. The displacement from the first to the second work station, and the subsequent squaring in the second work station, give rise to inevitable errors of positioning, which detract from perfect success of the grinding.

In addition, the grinding cycle has relatively lengthy unproductive times, caused substantially by the displacement of the sheets of glass between the two work stations.

Also, as a result of the errors of positioning at the two work stations, the grinding tools reach their limit condition of wear in periods of time which a priori are unforeseeable, and are sometimes extremely short, such that their maintenance and replacement is difficult to plan.

In addition, the known grinding systems of the above-described type have relatively large sizes, owing substantially to the presence of the two work stations, which are disposed along a path in the shape of an "L", and above all have a low level of flexibility, and are designed to process batches of sheets which all have the same dimensions, since the machining position of the grinding wheels cannot be adapted on the basis of the dimensions of each sheet to be processed, except by means of particularly lengthy setting times.

Japanese patent application JP 08 197 402 discloses a grinding machine in which the edge of a sheet of glass is ground in a single work station. For this type of machine there is a known need to grind sheets of glass of varying dimensions and geometries, particularly in such a way as to avoid interference between the grinding wheels and the glass supporting, positioning and retention members.

SUMMARY

The object of the present invention is to provide a grinding machine for machining sheets of glass, which makes it possible to solve the above-described problems simply and economically.

The present invention provides a grinding machine for machining sheets of glass having respective peripheral edges that at least partly require grinding. The machine comprises a support structure, a single work station accommodating positioning means for arranging the sheet of glass in an unambiguous reference position on a horizontal plane with respect to the support structure, retention means for retaining the sheet of glass in the reference position during grinding, and motorized grinding means for grinding the peripheral edge in the work station. The machine also comprises actuator means for vertically displacing the retention means between a raised position for machining the sheet of glass and a lowered rest position.

FIGURES

Figure 2:
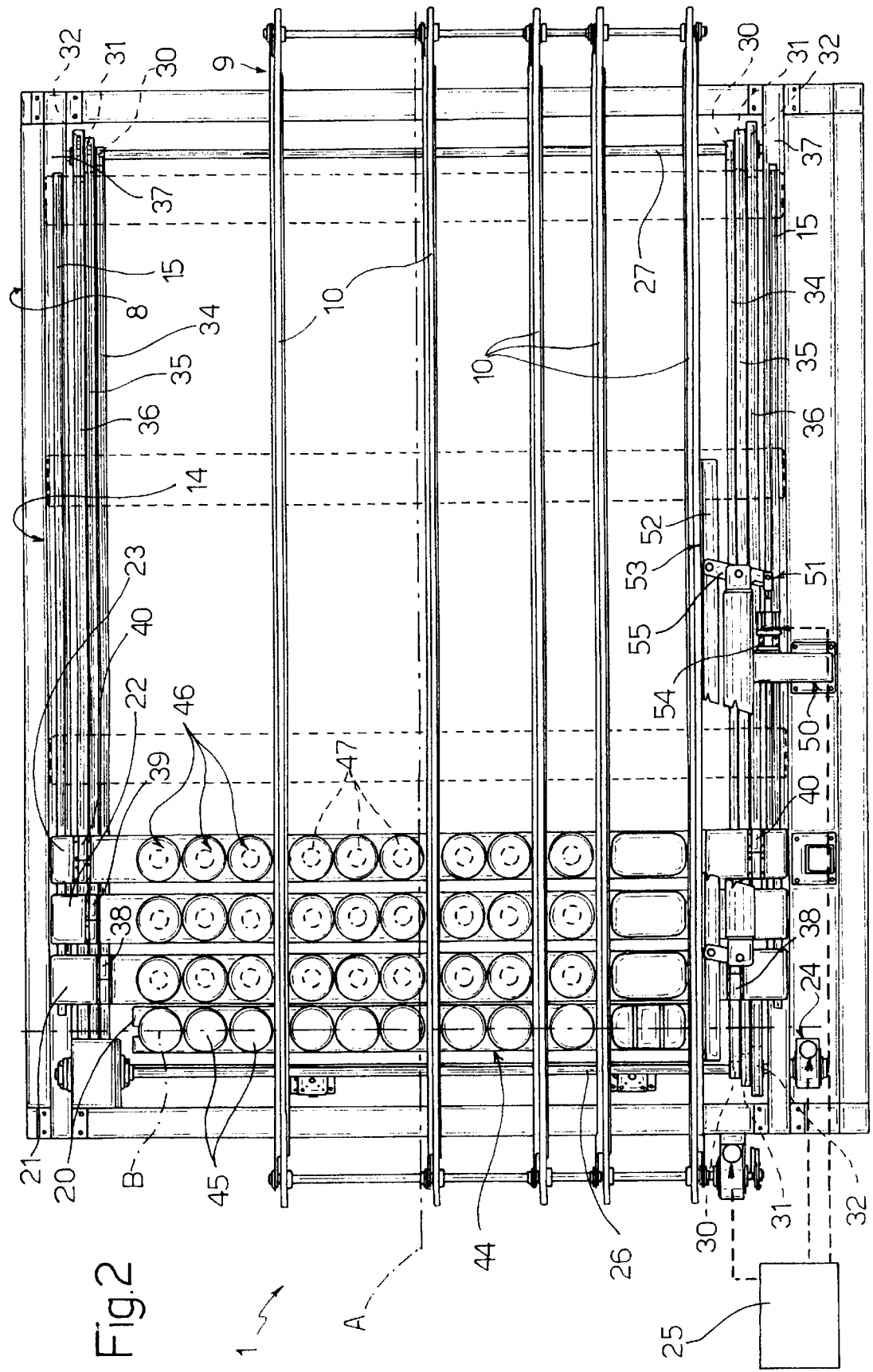

These and other features, aspects and advantages of the present invention will become better understood with regard to the following description, appended claims, and accompanying figures where:

FIG. 1 illustrates in perspective and schematically a preferred embodiment of the grinding machine for machining sheets of glass, produced according to the present invention; and FIG. 2 is a plan view, with parts removed for the sake of clarity, of a detail of the machine for grinding in FIG. 1.

DESCRIPTION

In FIG. 1, 1 indicates a grinding machine for machining sheets 2 of glass (partially illustrated), comprising respective rectangular perimeter edges 5 to be ground, which have dimensions which can optionally be different from one another.

The machine 1 comprises a base 8, which supports a conveyor unit 9, which, in particular, comprises a plurality of drive belts 10, in order to transfer the sheets 2 in succession one after another, along a horizontal plane 11, in a longitudinal horizontal straight direction A, from a loading station 12, towards an unloading station 13, through a work station 14.

With reference to FIG. 2, the station 14 contains two straight longitudinal guides 15, which are disposed on opposite sides relative to the direction A, and are integral with the base 8, and four beams 20, 21, 22, 23, which extend in a horizontal direction B, which is at right-angles to the direction A, in positions which are adjacent to one another. The beam 20 is connected integrally to the base 8, in a position adjacent to the station 13, whereas the beams 21, 22, 23 are connected to the guides 15, such as to slide in the direction A, between the beam 20 and the station 12, and are actuated by a movement unit 24, which is controlled by an electronic command and control unit 25 (illustrated schematically).

The unit 24 comprises a motorized shaft 26 and an idle shaft 27, each of which can rotate around its own axis, parallel to the direction B, and at its ends supports two sets of three wheels 30, 31, 32, which are keyed in fixed positions, coaxially relative to one another, on the corresponding shaft 26, 27, and have respective radii which increase from the wheel 30 to the wheel 32, in order to define ratios of transmission which are different from one another. The unit 24 also includes two sets of three belts 34, 35, 36, which extend in the lateral portions 37 of the base 8, are each wound around a pair of wheels 30, 31, 32, and comprise respective sections 38, 39, 40, which are each connected integrally to the corresponding beam 21, 22, 23.

Each of the beams 20, 21, 23, 23 supports a row of suckers 45, which have an upper surface 46 to support the sheet 2 to be ground, constitute part of a retention unit 44, which is controlled by the unit 25, in order to retain the sheet 2 itself on the surface 46 during grinding, and are connected to a suction pump (not illustrated) by means of respective pneumatic control valves (not illustrated). Each sucker 45 supports a lower rod, which is connected to a pneumatic cylinder, which is integral with the corresponding beam 20, 21, 22, 23, and defines together with the corresponding rod an actuator 47 (illustrated schematically), which is controlled by the unit 25, in order to displace the suckers 45 between a raised position, in which the sheet 2 is disposed in a position spaced from the belts 10 in order to be ground, and a lowered rest position, in which the sheet 2 is disposed on the belts 10, in order to be transferred from and to the station 14 on the plane 11.

The station 14 accommodates a positioning unit 50, which is controlled by the unit 25, in order to dispose each sheet 2 to be processed in a reference position on the plane 11, relative to the base 8, and comprises a retractable reference stop (not illustrated) of a known type, which is supported by the base 8, and an alignment device 51, which is supported by the lateral portion 37. In particular, the device 51 comprises a thrust unit 52, which is delimited by a surface 53, parallel to the direction A, and is actuated by an actuator 54, by means of interposition of a four-bar chain lever system 55, in order to displace the surface 53 parallel to itself in the direction B, against one side 5b of the sheet 2, thus aligning the side 5b itself in the direction A.

As illustrated in FIG. 1, the station 14 contains a frame 56, which is fixed relative to the base 8, and comprises a portal 57, which extends along an ideal line of separation of the stations 14 and 13, and comprises a cross-member 58, which faces the base 8 and is parallel to the direction B. The frame 56 also comprises two battens 59, 60, which extend from the ends of the cross-member 58 in the station 14, constitute part of corresponding lateral portals 59a, 60a, and comprise respective guides 61, 62 parallel to the direction A.

The frame 56 supports two bridges 63, 64, of which the bridge 63 is interposed between the cross-member 58 and the bridge 64, and which are parallel to the cross-member 58, comprise respective opposite end portions 65, which are connected to the battens 59, 60 by means of interposition of the guides 61, 62, and are actuated by respective independent motors (not illustrated), which are accommodated in the frame 56, and are controlled by the unit 25, in order to translate the bridges 63, 64 themselves along the guides 61, 62.

The cross-member 58 and the bridges 63, 64 comprise respective guides 70, 71, 72, parallel to the direction B, whereas the batten 59 comprises a guide 73, parallel to the direction A. There are connected in a sliding manner to the guides 70, 71, 72, 73 respective grinding heads 74, 75, 76, 77, which are actuated by respective motors (not illustrated), which are independent from one another, are accommodated in the frame 56, and are controlled by the unit 25, in order to displace the heads 74, 75, 76, 77 themselves simultaneously along respective transverse paths which are incident relative to one another, defined by the guides, such as to grind respective sides 5a, 5b, 5c, 5d of the edge 5, which are transverse relative to one another, and consecutive.

In use, the sheets 2 are loaded one after another on the station 12, by setting on the unit 25 the parameters relative to the perimeter dimensions to be obtained for the sheets 2 to be processed. The parameters can be set manually for each of the sheets 2, or they can be entered together with the number of consecutive sheets 2 which have the same dimensions, or they can be taken from a data base which is stored and resident in the unit 25, or in a remote computer (not illustrated), which is connected to the unit 25 itself. It is understood that the machine 1 comprises sensors (not illustrated), which allow the unit 25 to detect the type of sheet 2 present on the station 14, and check the accuracy of the parameters set.

During transfer of the sheet 2 to be processed, towards the station 14, the unit 25 controls actuation of the shaft 26, in order to make the belts 34, 35, 36 run at different linear speeds from one another, and such as to move the beams 21, 22, 23 apart from one another progressively, on the basis of the dimensions of the sheet 2, keeping the beams 20, 21, 22, 23 equally spaced.

When the sheet 2 reaches the station 14, the unit 25 firstly controls the unit 50, in order to position the sheet 2 in an unambiguous reference position, adjacent to the cross-member 58 and to the batten 59, and then the unit 44, in order to actuate only the suckers 45 covered by the sheet 2. Subsequently, the unit 25 actuates the actuators 47 associated with the suckers 45 which are retaining the sheet 2, such as to bring the sheet 2 itself into the raised machining position.

While these operations are being carried out on the sheet 2, the unit 25 commands firstly translation of the bridge 64 and of the head 75 along the corresponding guides 62 and 71, and secondly, translation of the heads 74, 76, 77 and of the bridge 63 along the corresponding guides 70, 72, 73 and 61, in order to adapt the grinding cycle to the dimensions of the sheet 2, and to position the heads 74, 76, 77 and 75 in respective corresponding points for commencement of machining, each at a vertex of the edge 5. Simultaneously, the configuration of the grinding wheels of each head 74, 75, 76, 77 is regulated by the unit 25, on the basis of the thickness of the sheet of glass 2 to be ground.

During the grinding operations, the heads 74, 76, 77 and the bridge 63 are controlled by the unit 25, such as to be translated simultaneously along the corresponding guides 70, 72, 73 and 61, in directions such that the heads 74, 75, 76, 77 are displaced in an unambiguous direction of travel or advance of the edge 5, following one another without interfering with one another. The point or vertex of completion of machining of each head 74, 75, 76, 77 coincides with the point or vertex of commencement of machining of the following side 5a, 5b, 5c, 5d. When the grinding has been completed, the actuators 47 are controlled such as to take the suckers 45 into their lowered position, and the suckers 45 themselves are deactivated in order to release the sheet 2, which is then transferred towards the station 13. The subsequent sheet 2 is already on the station 14, in particular in the case in which the sheet 2 which is being processed is smaller than the station 14 itself, and is transferred such as to initiate a new cycle on the basis of the parameters entered in the unit 25.

It is apparent from the foregoing that the fact that sides 5a, 5b, 5c, 5d of the edge 5 which are transverse and/or incident relative to one another are ground at a single station 14, makes it possible to dispose each sheet 2 in single reference position or "zero" position for all the grinding operations, thus avoiding displacements of the sheet 2, unlike the situation for the known solutions, in which the sheet 2 must be ground along a first direction, displaced, and ground along a second direction, which is transverse relative to the first. Thus, the machine 1 makes it possible to restrict errors of positioning compared with the known solutions, and to obtain a quality which is substantially unvaried, from one finished sheet 2 to the next.

As a result of the reduction in the errors of positioning, wear of the grinding wheels is gradual, such that planning of maintenance of the grinding wheels themselves is relatively reliable.

Compared with the known solutions, the cycle carried out by the machine 1 also has relatively short unproductive times, since, firstly, each sheet 2 need not be displaced in order to carry out the grinding on the various sides 5a, 5b, 5c, 5d, and, secondly, the heads 74, 75, 76, 77 are displaced simultaneously, and are positioned at the respective points for commencement of machining during displacement of the sheets 2 from and towards the station 14. The fact that the initial position of the heads 74, 75, 76, 77 is regulated quickly makes the machine 1 extremely flexible, i.e. it allows the machine 1 itself to grind successive sheets 2 with dimensions which are different from one another.

Again compared with the known solutions, the machine 1 also has restricted dimensions, since it comprises a single work station 14, which is disposed along a straight Again compared with the known solutions, the machine 1 also has restricted dimensions, since it comprises a single work station 14, which is disposed along a straight direction A.

The fact that the sheet 2 to be ground is raised by means of the suckers 45 enables the heads 74, 75, 76, 77 not to interfere with the base 8, and with the optional suckers 45, or with other devices for positioning the sheets 2, which are located outside of the projection of the edge 5 onto the plane 11. Moreover, the unit 24 makes it possible to adapt the position of the suckers 45, and to render stable the positioning and retention of sheets 2 which have dimensions different from one another.

Finally, the structure comprising the base 8, the frame 56 and the bridges 63, 64 is very rigid, thus keeping the errors within very narrow limits.

Finally, it is apparent from the foregoing that modifications and variants can be made to the machine 1 described, which do not depart from the field of protection of the present invention.

In particular, the machine 1 could comprise only one pair of grinding heads which are disposed on guides or paths which are transverse and/or incident relative to one another, or it can be pre-set in order to grind sheets of glass other than the quadrilateral ones illustrated by way of example. In addition, the units 24 and 50 could be different from those illustrated and described Although the present invention has been discussed in considerable detail with reference to certain preferred embodiments, other embodiments are possible. Therefore, the scope of the appended claims should not be limited to the description of preferred embodiments contained in this disclosure.

What is claimed is:

1. A machine for machining sheets of glass, each sheet of glass having a size, a shape and tour edges, the machine comprising:

a) a base; and b) a work station connected to the base, and comprising four grinding heads and four guides;

where the four guides are all in one plane;

where each grinding head is configured to grind a corresponding edge of the sheet of glass;

where the guides comprises a pair of first guides that are parallel to one another, and a pair of second guides that are parallel to one another; and where the first guides are perpendicular to the second guides.

2. The machine of claim 1, further comprising a loading station connected to the base.

3. The machine of claim 2, where the base farther comprises a conveyor unit for transferring the sheets in succession one after another from the loading station through the work station.

4. The machine of claim 1, where one or more than one of the grinding heads is movable.

5. The machine of claim 4, farther comprising a command and control unit for moving one or more than one of the grinding heads along the corresponding edge or edges of the sheet of glass.

6. The machine of claim 4, further comprising a command and control unit for moving one or more than one of the grinding heads in response to the size or the shape of the glass to be machined.

7. The machine of claim 1, where one or more than one of the guides is movable.

8. The machine of claim 7, further comprising a command and control unit for moving one or more than one of We guides along the corresponding edge or edges of the sheet of glass.

9. The machine of claim 7, further comprising a command and control unit for moving one or more than one of the guides in response to the size or the shape of the glass to be machined.

10. A machine for machining sheets of glass, each sheet of glass having a size, a shape and four edges, the machine comprising:

a) a base; and b) a work station connected to the base, and comprising a plurality of means for grinding an edge of the sheet of glass, and comprising a plurality of means for guiding the means for grinding;

where the four guides are all in one plane;

where each means for grinding is configured to grind a corresponding edge of the sheet of glass;

where the plurality of means for guiding comprise a pair of first guides that are parallel to one another, and a pair of second guides that are parallel to one another; and where the first guides are perpendicular to the second guides.

11. The machine of claim 10, further comprising a loading station connected to the base.

12. The machine of claim 11, where the base further comprises a conveyor unit for transferring the sheets in succession one after another from the loading station through the work station.

13. The machine of claim 10, where one or more than one of the means for grinding is movable.

14. The machine of claim 13, further comprising a command and control unit for moving one or more than one of the means for grinding along the corresponding edge or edges of the of glass.

15. The machine of claim 13, further comprising a command and control unit for moving one or more than one of the means for grinding in response to the size or the shape of the glass to be machined.

16. The machine of claim 12, where one or more than one of the means for guiding is movable.

17. The machine of claim 16, further comprising a command and control unit for moving one or more than one of the means for guiding along the corresponding edge or edges of the sheet of glass.

18. The machine of claim 16, further comprising a command and control unit for moving one or more than one of the means for guiding in response to the size or the shape of the glass to be machined.

* * * * *

UNITED STATES PATENT AND TRADEMARK OFFICE
CERTIFICATE OF CORRECTION

PATENT NO. : 6,604,984 B2
DATED : August 12, 2003
INVENTOR(S) : Davide Gariglio

It is certified that error appears in the above-identified patent and that said Letters Patent is hereby corrected as shown below:

Column 6,
Line 32, replace "We" with -- the --.

Signed and Sealed this

Thirtieth Day of September, 2003

JAMES E. ROGAN
*Director of the United States Patent and Trademark Office*